United States Patent [19]

Zaveruha

[11] Patent Number: 5,253,422
[45] Date of Patent: Oct. 19, 1993

[54] THREAD GAGING TOOL AND METHOD

[75] Inventor: Alexander A. Zaveruha, Stratford, Conn.

[73] Assignee: McMellon Bros, Inc., Stratford, Conn.

[21] Appl. No.: 793,808

[22] Filed: Nov. 18, 1991

[51] Int. Cl.$^5$ ............................................. G01B 3/36
[52] U.S. Cl. .................................................. 33/199 R
[58] Field of Search ........................... 33/199 R, 199 B

[56] References Cited

U.S. PATENT DOCUMENTS

| | | | |
|---|---|---|---|
| 1,294,004 | 2/1919 | Weaver | 33/199 R |
| 2,214,633 | 9/1940 | Dillon | 33/199 R |
| 2,432,160 | 12/1947 | Johnson | 33/199 R |
| 2,586,053 | 2/1952 | Johnson | 33/199 R |
| 2,597,644 | 5/1952 | Johnson | 33/199 R |
| 2,624,125 | 1/1953 | Johnson | 33/199 R |
| 2,745,188 | 5/1956 | Wills et al. | 33/199 R |
| 2,770,050 | 11/1956 | Johnson | 33/199 R |
| 2,789,360 | 4/1957 | Finley et al. | 33/199 R |
| 2,842,862 | 7/1958 | Johnson | 33/199 R |
| 2,849,804 | 9/1958 | Johnson | 33/199 R |
| 3,270,427 | 9/1966 | Johnson | 33/199 R |
| 3,277,578 | 10/1966 | Johnson et al. | 33/199 R |
| 3,331,136 | 7/1967 | Inman | 33/199 |
| 3,827,154 | 8/1974 | Kaifesh | 33/199 R |
| 4,219,938 | 9/1980 | Tommeraas | 33/199 R |
| 4,745,685 | 5/1988 | Castillo | 33/199 R |
| 4,965,936 | 10/1990 | Seutman | 33/199 R |

Primary Examiner—William A. Cuchlinski, Jr.
Assistant Examiner—William C. Dowling
Attorney, Agent, or Firm—John H. Crozier

[57] ABSTRACT

In a preferred embodiment, a tool for measuring the shape of the groove of a thread, the tool measuring the plus or minus radial positions of pairs of points including the pitch diameter point on one flank to the addendum or the dedendum of the other flank. Comparison of these measurements with the pitch diameter as a base line gives a profile of the shapes of the flank. For determining whether the threads of a screw have shrink lead, stretch lead, taper, or drunk, the tool includes first and second measuring portions, the first measuring portion including at least first and second measuring teeth spaced apart along a portion of a length of the screw on either side of a central portion thereof a multiple of the pitch, and having the flanks of the teeth facing away from the central portion cut away a selected amount, the second measuring portion including at least third and fourth measuring teeth being cut away oppositely to the first and second teeth, any difference in the amount of entry of these two sections the relation to the amount of insertion of a master form indicating the amount of drunk, stretch or shrink lead, or taper of the thread.

11 Claims, 10 Drawing Sheets

THREAD GAGING TOOL AND METHOD

BACKGROUND OF THE INVENTION

1. Field of the Invention

The present invention relates to thread gaging generally and, more particularly, but not by way of limitation, to a novel thread gage and method that permit rapid and convenient measurement of the parameters of a thread.

2. Background Art

A screw thread is a helical surface formed on a member and two such surfaces are commonly employed for joining members, typically intersection of a pair of internally and externally complementarily threaded cylindrical members. Similar surfaces are provided on gears for the transmission of motion between two or more gears.

Depending on the application, the dimensional accuracy with which such threads are formed is more or less critical. Over time, standards have evolved for measuring the dimensional accuracy of threads. See, for example, "Gages and Gaging for Unified Inch Screw Threads," ANSI/ASME B1.2-1983, published by The American Society of Mechanical Engineers, New York, N.Y., which document and the references cited therein are made a part hereof by incorporation by reference hereinto.

The primary measurement applied to straight screw threads is that of "pitch diameter" which is commonly defined as the diameter of an imaginary cylinder, the surface of which would pass through the threads at such points as to make equal the width of the threads and the width of the spaces cut by the surface of the cylinder. Conventional methods of making this measurement involve the contacting of the flanks of opposing threads with a "three-wire" gage, a "best-wire-size" gage, or "cone and vee" gages. A substantial limitation of these devices is that they, and variations thereof, contact the flanks of the threads at single points or at narrow lengths thereof. Consequently, if a thread had the appropriate dimension at the points of contact, but were otherwise greatly misshapen, the thread would pass inspection without the defects being discovered. Misshapenness in terms of excess metal on the flanks of the thread may be discovered through the use of a "full-form" gage roll which substantially fills the entire thread, but this type of gage will not ordinarily discover many types of misshapenness where there is missing metal. The only known satisfactory way to fully analyze the true shape of the flanks of a thread is through the use of optical imaging devices. These are somewhat cumbersome and require a separate operation from the standard thread gaging operation.

Another parameter of importance in measuring the accuracy of the forming of thread is that of lead "stretch" or "shrink", that is, a variation in thread spacing that is greater or less, respectively, than desired. This parameter is typically measured through the use of a multiple-rib, full-form gage roll which inserts teeth in a plurality of grooves of the thread. Comparing this depth to that of a single full form rib indicates that there is lead stretch, shrink, or thread taper, but it is not possible to determine which exists from the measurement and, consequently, further investigation must be made to determine whether stretch or shrink lead or taper is present.

A further imperfection in threads is a drunk thread in which a portion of a single turn of the thread is of greater or less thickness than it should be. Again, conventional thread gaging methods cannot easily distinguish this imperfection from the others noted above.

Accordingly, it is a principal object of the present invention to provide means and method for gaging threads that can readily detect variations in the shape of the flanks of the threads.

It is an additional object of the present invention to provide means and method for gaging threads that can readily detect whether threads have stretch or shrink lead or taper.

It is a further object of the invention to provide such means and method for gaging threads that can readily detect drunk threads.

It is another object of the invention to provide such means and method that are rapidly and conveniently employed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others by providing, in a preferred embodiment, a tool for measuring the shape of the groove of a thread, the tool measuring the plus or minus radial positions of pairs of points including the pitch diameter point on one flank to the addendum or the dedendum of the other flank. Comparison of these measurements with the pitch diameter as a base line gives a profile of the shapes of the flank. For determining whether the threads of a screw have shrink lead, stretch lead, taper, or drunk, the tool includes first and second measuring portions, the first measuring portion including at least first and second measuring teeth spaced apart along a portion of a length of the screw on either side of a central portion thereof a multiple of the pitch, and having the flanks of the teeth facing away from the central portion cut away a selected amount, the second measuring portion including at least third and fourth measuring teeth being cut away oppositely to the first and second teeth, any difference in the amount of entry of these two sections the relation to the amount of insertion of a master form indicating the amount of drunk, stretch or shrink lead, or taper of the thread.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Reference should now be made to the Drawing, in which similar or identical elements are given consistent identifying numerals throughout the various figures thereof and in which parenthetical references to figure numbers direct the reader to the view(s) in which the element(s) being described is (are) best seen, although the element(s) may be seen also in other views.

Figure 1:
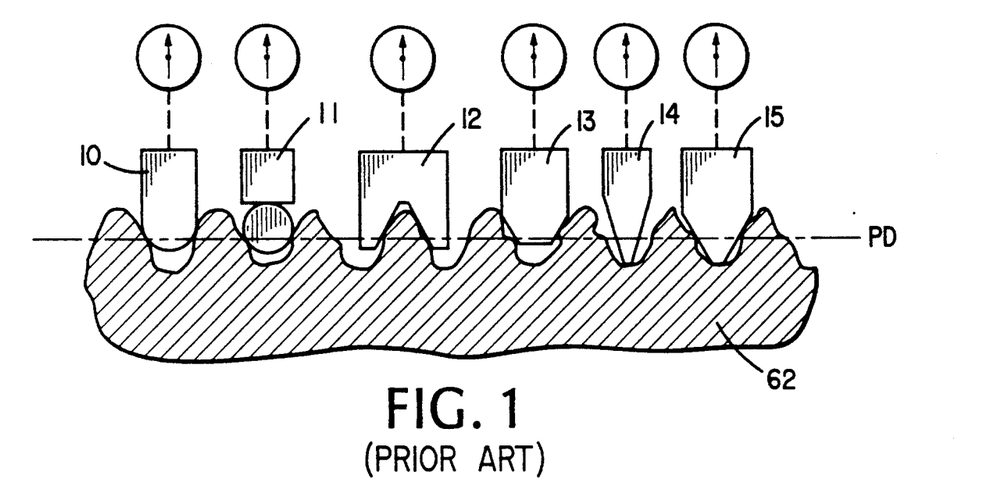
FIG. 1 is a fragmentary side elevational view, partially schematic and partially in cross-section, of a thread illustrating in which are inserted various types of conventional thread gages.

FIG. 1 illustrates several types of conventional thread measuring gages shown here as gages 10-15 inserted in the grooves of a thread 62. Gage 10 is a thread roll gage with best-wire-size shape, gage 11 is a best-wire-size gage, gage 12 is a roll vee gage, gage 13 is a pitch diameter cone gage, gage 14 is a 55° roll root depth gage, and gage 15 is a single full form roll gage. It can be seen that, except for gage 14, each of gages 10-15 contacts the flanks of the grooves of thread 62 at its pitch diameter line, "PD", and, thus, none of the readings of those gages will disclose any minus irregularity of the flanks of the grooves. Gage 14, being limited to measuring the root depth of thread 62 would not, in any case, be able to detect flank irregularities.

Figure 2:
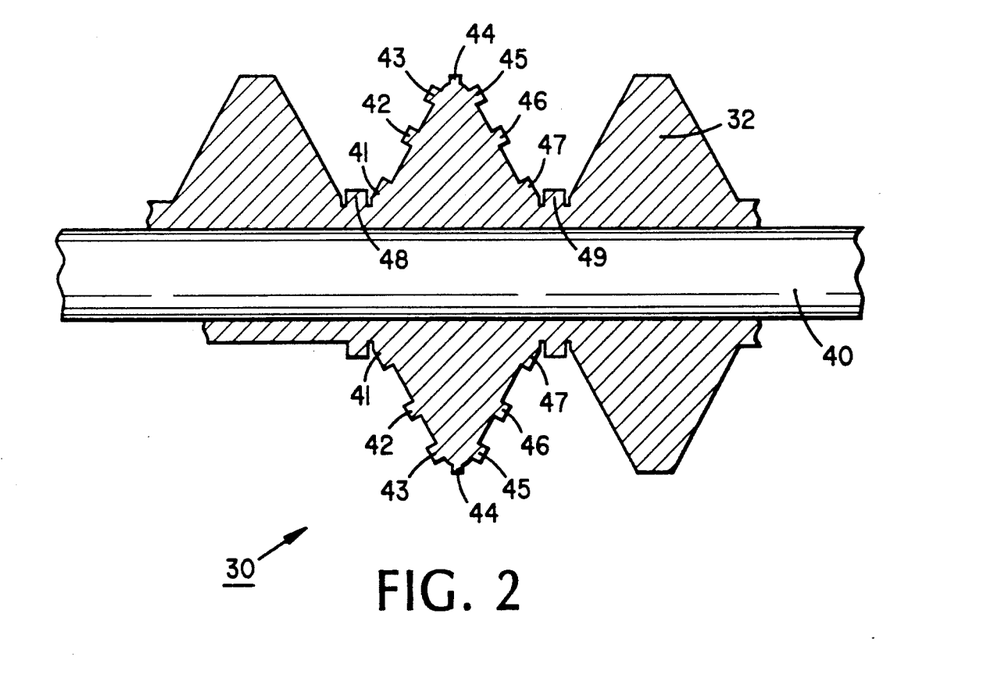
FIG. 2 is a fragmentary side elevational view, partially in cross-section, of a master form which can be used to manufacture a first embodiment of the present invention.

FIG. 2 shows part of a master form from which a tool of the present invention may be machined, the single ridge master form being generally indicated by the reference numeral 30 and extending radially from a central axially extending portion 40. Single rib master form 32 may be conveniently machined from one rib on a conventional multirib, full form gage roll 32. It can be seen that master form 30 has been machined so that bosses 41-49 can be left extended outwardly therefrom, the top surfaces of the bosses being part of surface of the original masterform.

Figure 3:
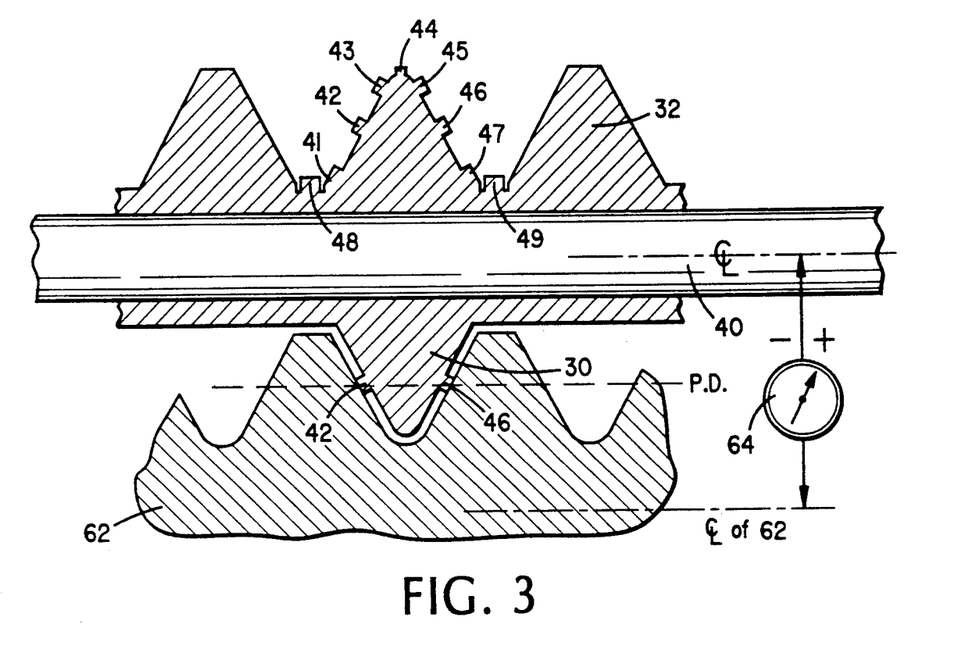
FIG. 3 is a fragmentary side elevational view, partially in cross-section, of a first embodiment of the present invention gaging a threaded part at the pitch diameter line of both flanks.

FIG. 3 illustrates the use of a gaging ridge, generally indicated by the reference numeral 30, machined from master form roll 32 (FIG. 2). Gaging ridge 30 with bosses remaining at 42 and 46 contacts the flanks of the groove at the pitch diameter line "PD". Gaging ridge 30 with bosses 42 and 46 is operatively connected by conventional means to a conventional mechanical or electronic gage 64 to measure the radial position of the gaging ridge with respect to the axis of screw thread 62. Having a "PD" datum base established by the measurement with bosses 42 and 46 on ridge 30, it is now possible to measure all the plus and minus deviations of the thread form of screw 62 by presenting different combinations of bosses 41- 49 on ridge 30. FIG. 4 illustrate some of these combinations.

Figure 4A:
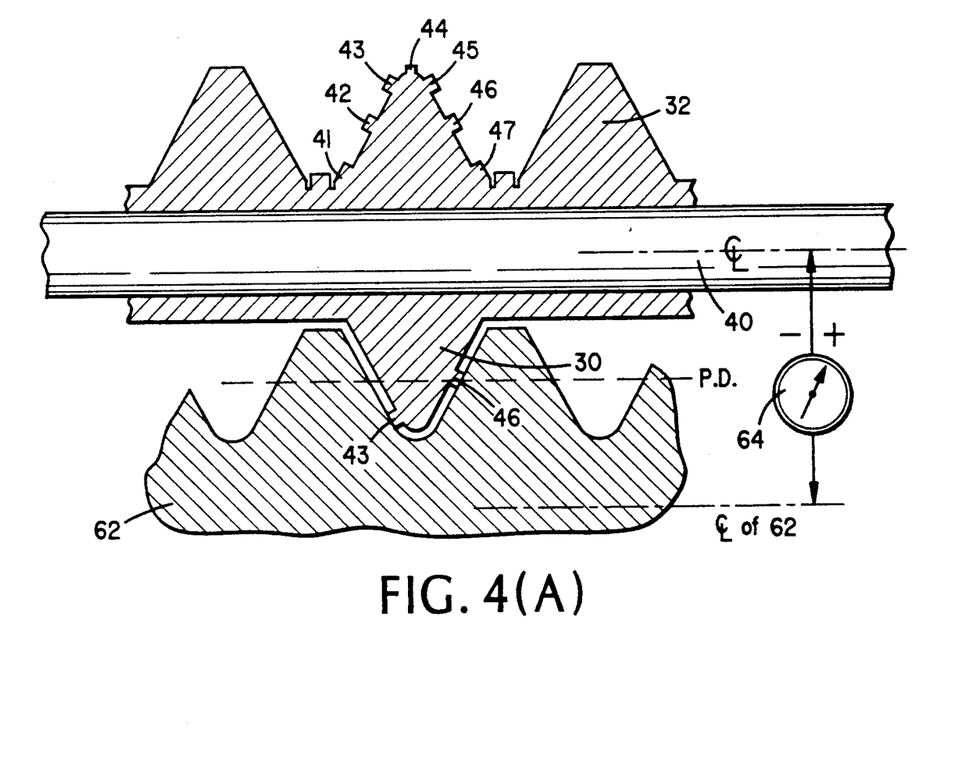
FIGS. 4(A)–4(J) are fragmentary side elevational views, in cross-section, of the first embodiment of the present invention gaging a thread.

In FIG. 4(A), for example, a segment of gaging ridge 30 has been machined to leave bosses 43 and 46 protruding therefrom. So machined, gaging ridge 30 is shown as measuring the rise or fall (plus or minus on gage 64) of the left flank dedendum.

Figure 4B:
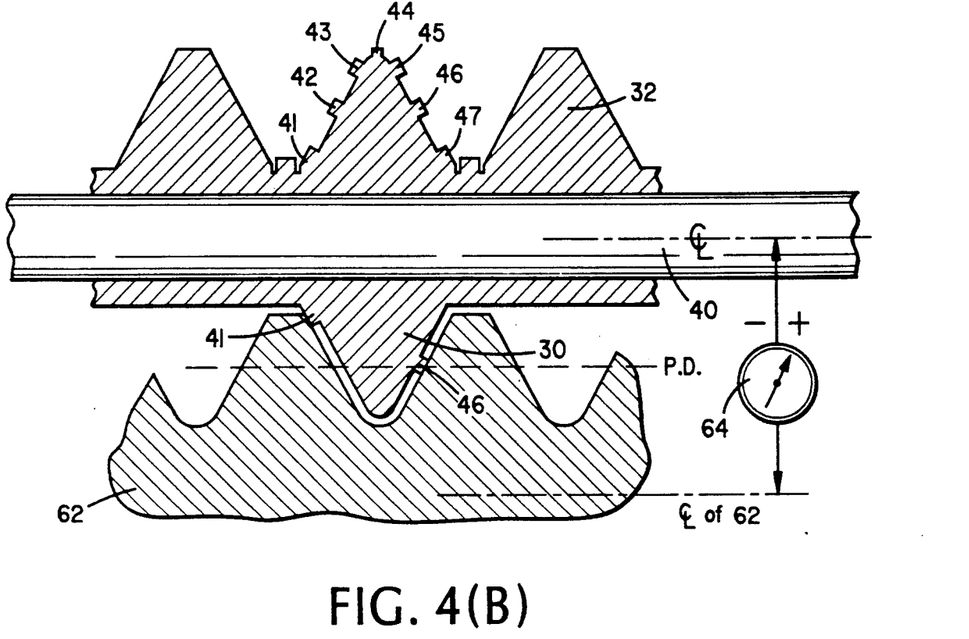

Likewise, FIG. 4(B) shows a segment of ridge 30 with bosses 41 and 46 measuring the plus or minus of the addendum of the left flank.

Figure 4C:
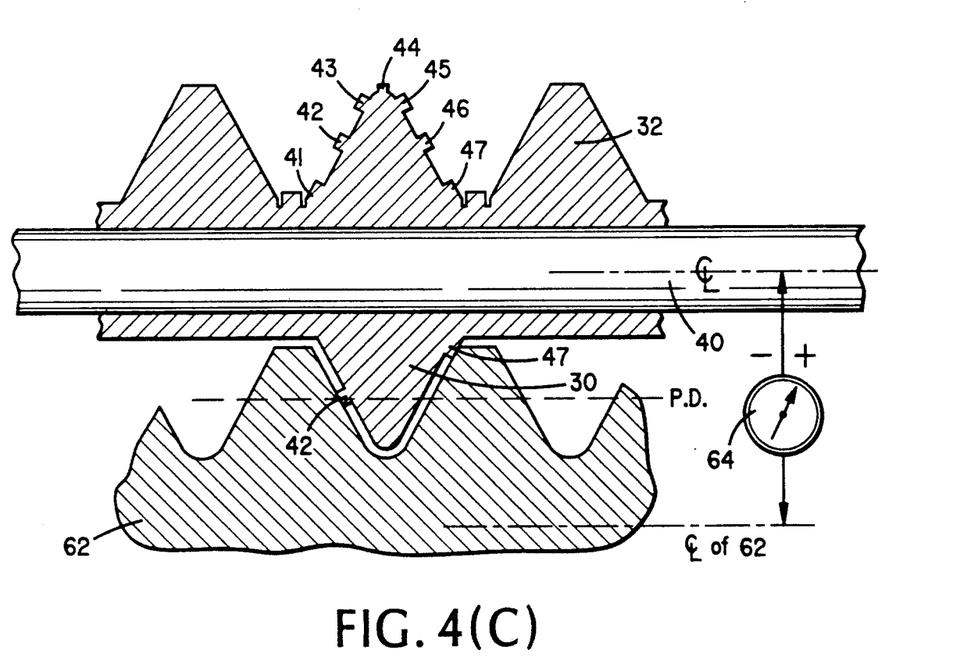

FIG. 4(C) shows a segment of ridge 30 with bosses 42 and 47 measuring the plus or minus of the addendum of the right flank.

Figure 4D:
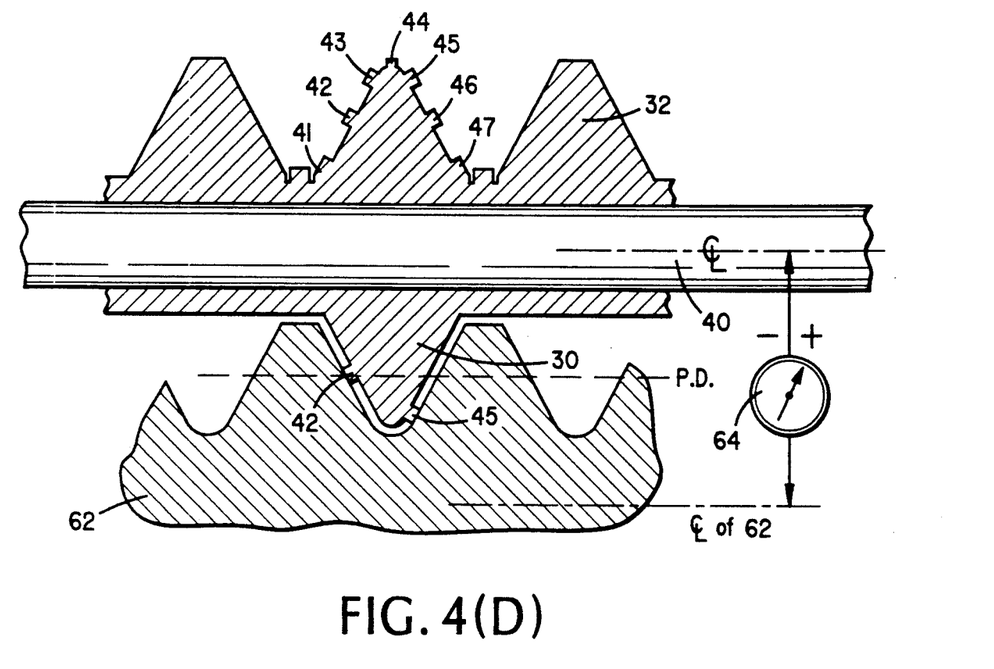
Figure 4E:
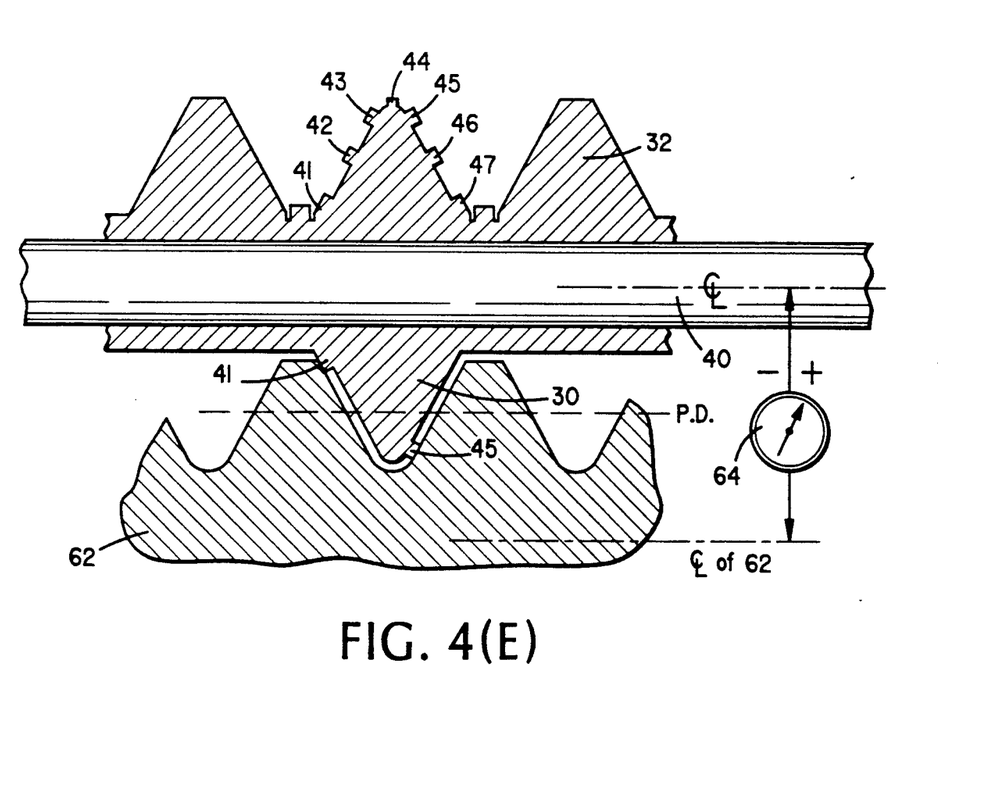
Figure 4F:
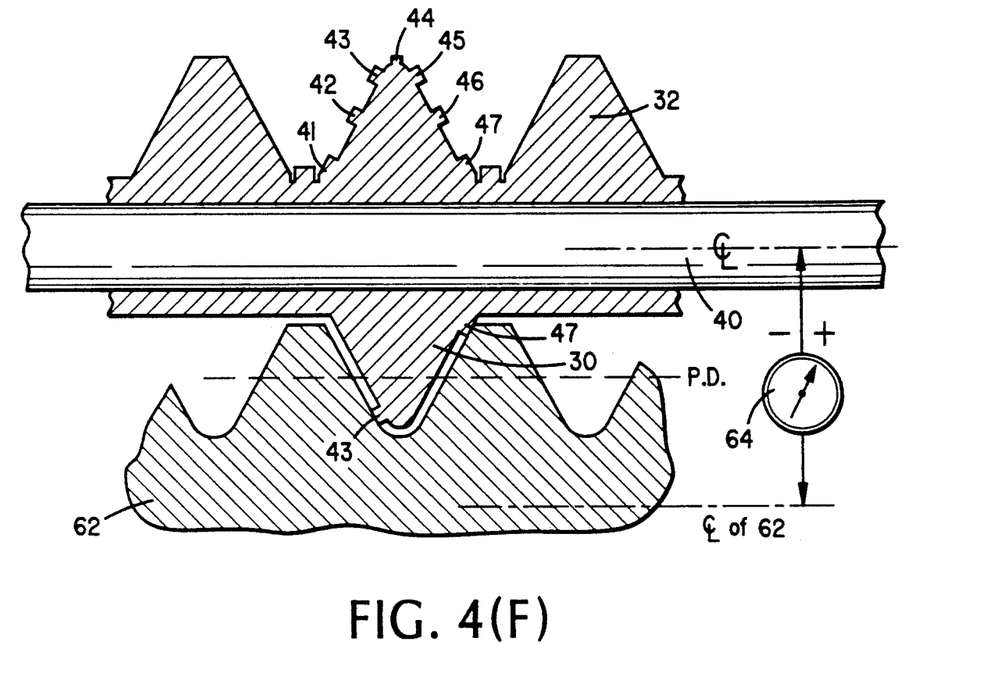
Figure 4G:
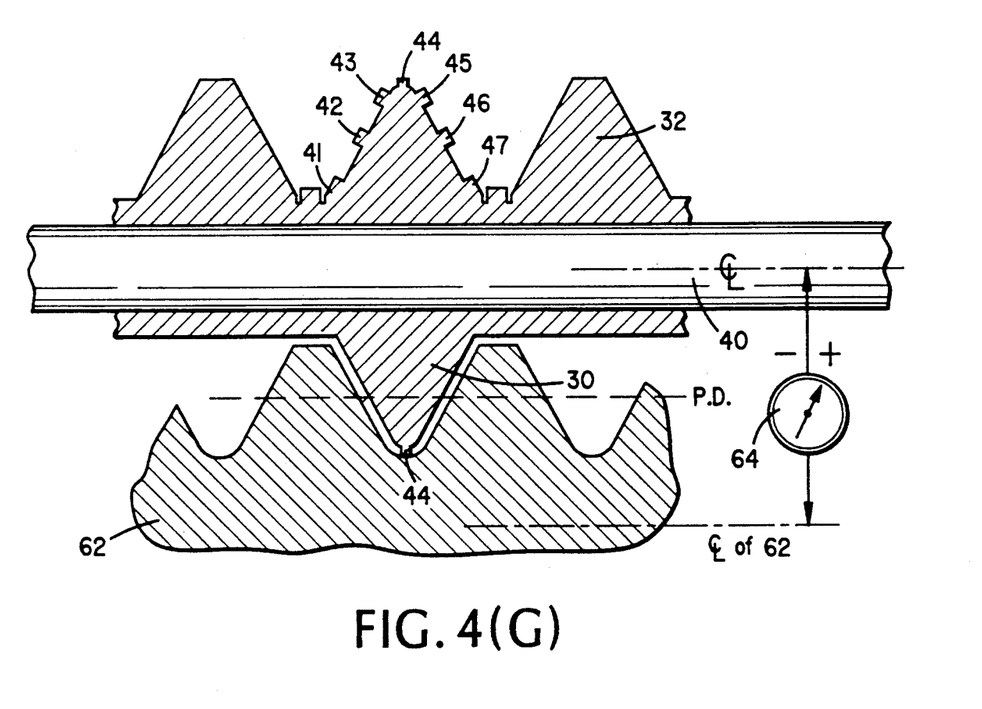
Figure 4H:
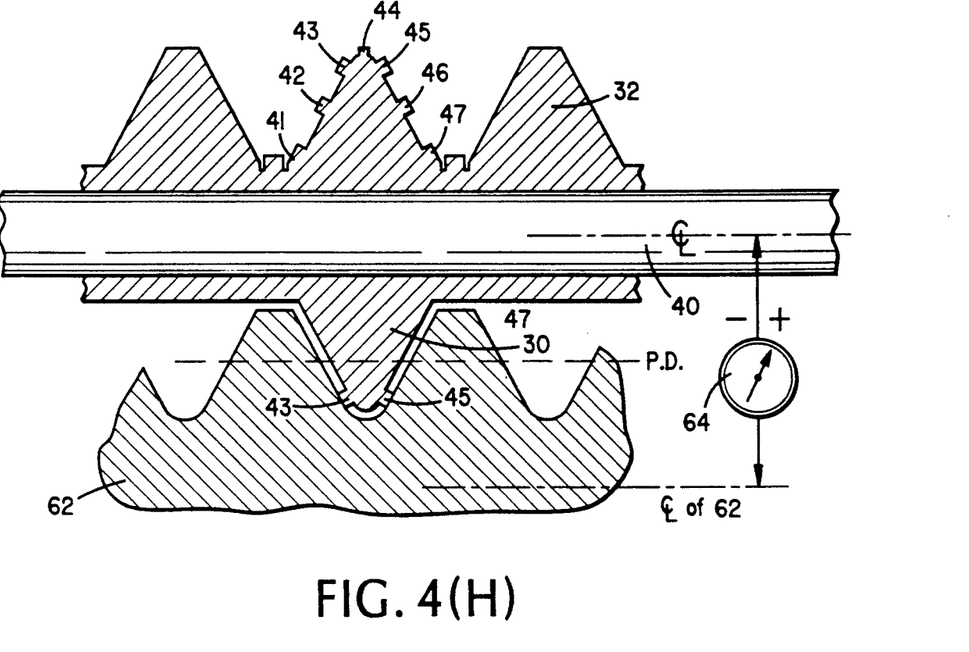
Figure 4I:
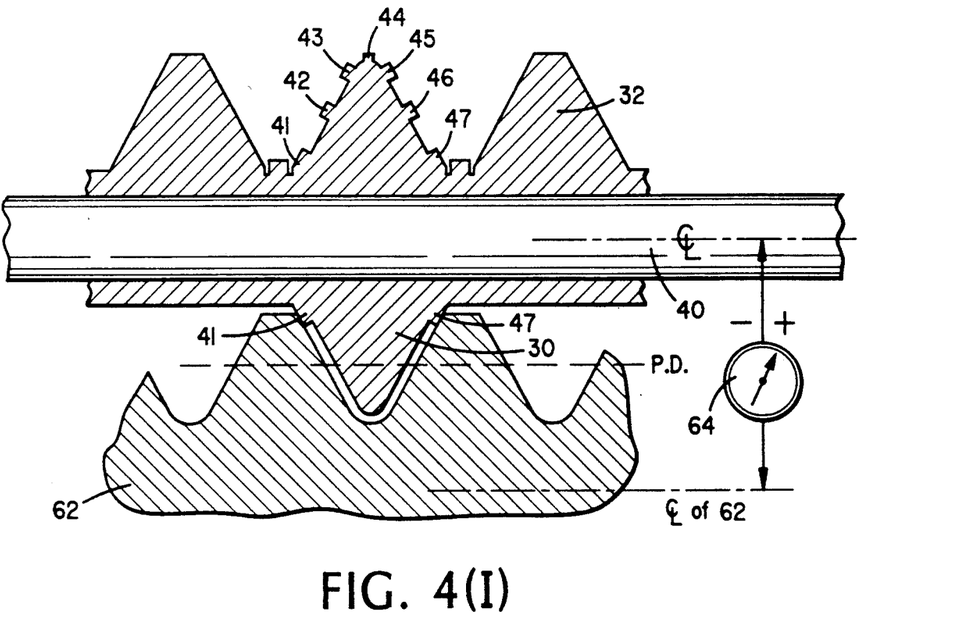

FIG. 4(D) shows a segment of ridge 30 with bosses 42 and 45 measuring the plus or minus of the right flank dedendum.

The foregoing measurements can be directly related to the datum base taken from the measurement shown on FIG. 3 to obtain a profile measurement of the shape of the grooves of screw thread 62. All measurements on gage 64 are absolute for one element at a time.

FIGS. 4(E)–(I) show, if desired, other uses of ridge 30 with different boss pair combinations to further measure: left addendum to right dedendum, left dedendum to right addendum, root depth, dedendum width, and addendum width of the groove, respectively, to provide further indication of the shape of the groove in screw thread 62.

Figure 4J:
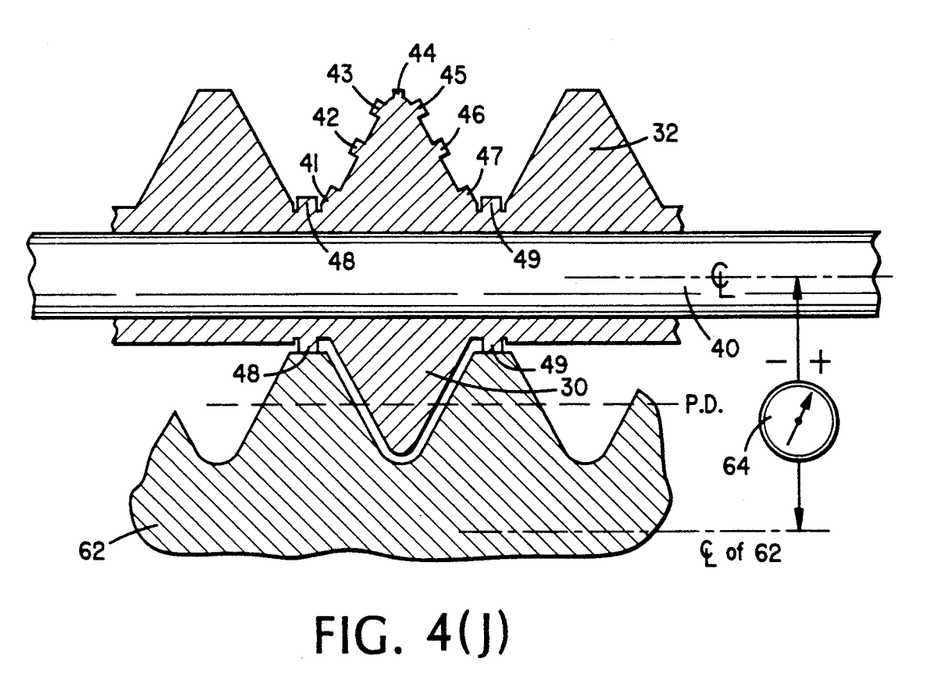

FIG. 4(J) uses the relation of a segment of ridge 30 with bosses 48 and 49 to relate the runout of the top of the thread of screw thread 62 to the "PD".

While FIG. 3 indicates ridge 30 (FIG. 2) as having been machined to leave bosses 42 and 46 to measure the "PD", it will be understood by those skilled in the art that separate segments of the same ridge form 30 can have one or more of the profiles shown on FIGS. 4(A)–(J). Consequently, by rotation of the gaging roll, two or more measurements on gage 64 may be made by repositioning of different segments of the gaging roll or by rotation of the thread being gaged or by movement of both. These measurements and comparisons are made from the repositioning of one master ridge 30 of roll 32 in one gage frame, thus eliminating transfer errors otherwise present when using multi-gage frames.

FIGS. 5(A)–(D) illustrate an embodiment of the present invention for determining whether a screw thread has "stretch" or "shrink" lead or "taper". Here, a master gaging roll, generally indicated by the reference numeral 32, is provided in the form of a multi-ridge, full-form gage roll, although the invention is not limited to such a construction.

Figure 5A:
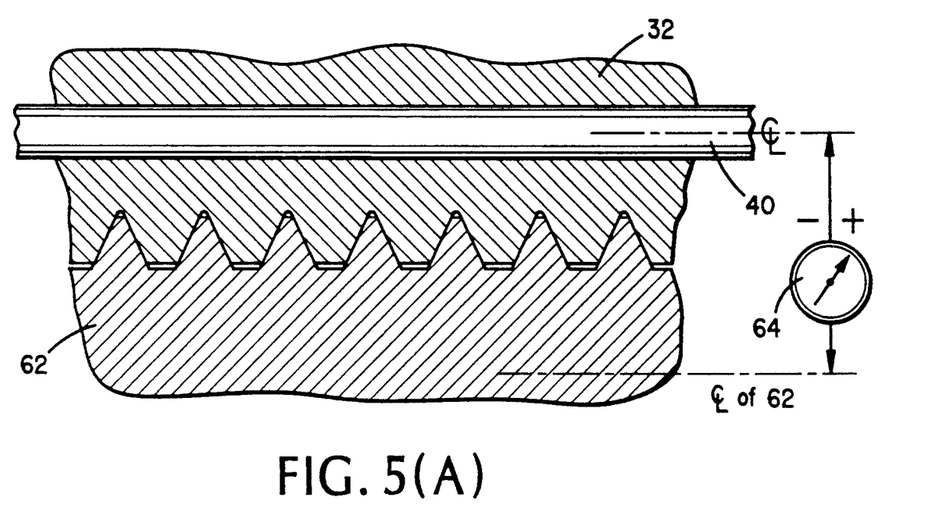
FIGS. 5(A)–(D) are fragmentary side elevational views of a second embodiment of the present invention.

FIG. 5(A) shows a full form segment of gaging roll 32 engaged with a thread 62 to be measured. this is a measurement that would encompass all plus elements (functional diameter) of the threaded product.

Figure 5B:
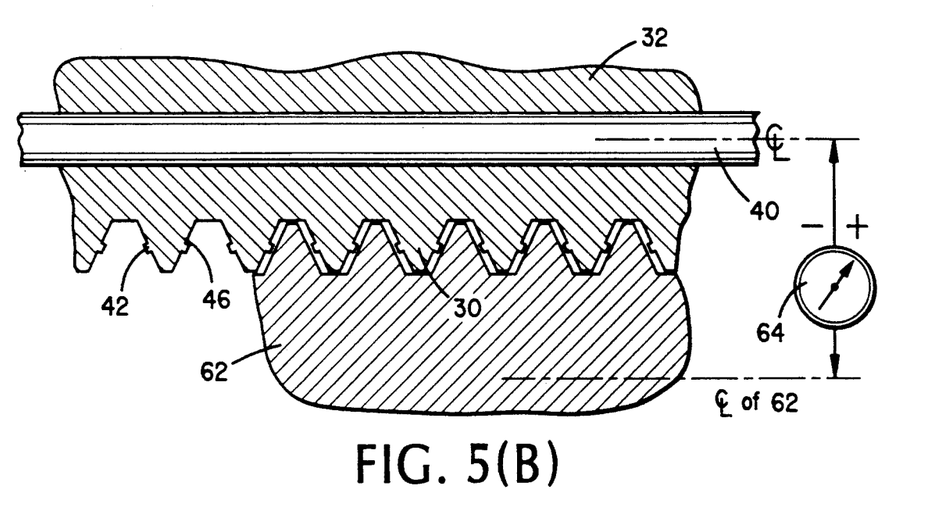

FIG. 5(B) shows a section of roll 32 with bosses 42 and 46 on all ridges of the gage as it presents itself to the "PD" of screw thread 62. Contacting at "PD" devoids the inclusion of flank angle error in measurement calibrations.

Figure 5C:
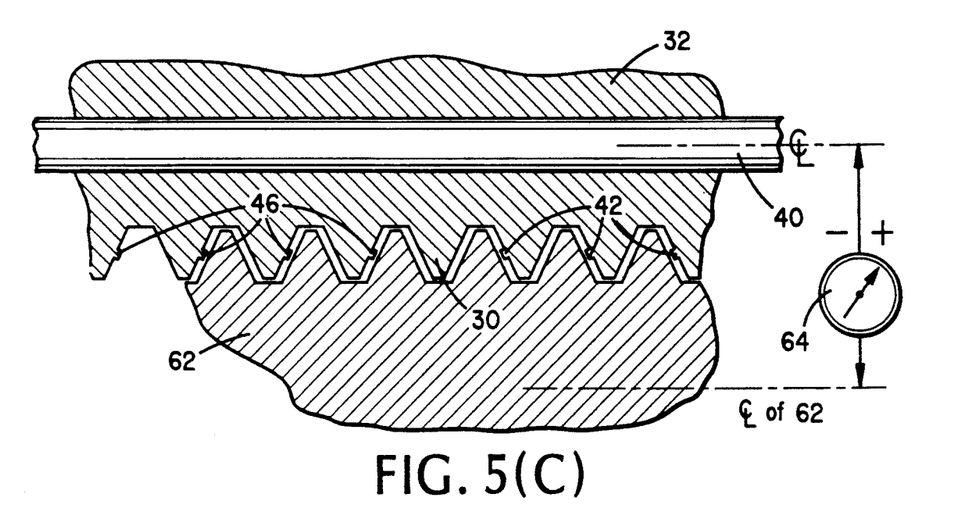

FIG. 5(C) shows a section of gage roll 32 with bosses 46 remaining on ridges to the left of center ridge 30 and bosses 42 remaining on ridges to the right of the center ridge. The other "PD" bosses on ridge 30 of this section of gage roll 32 are removed from the ridge.

Figure 5D:
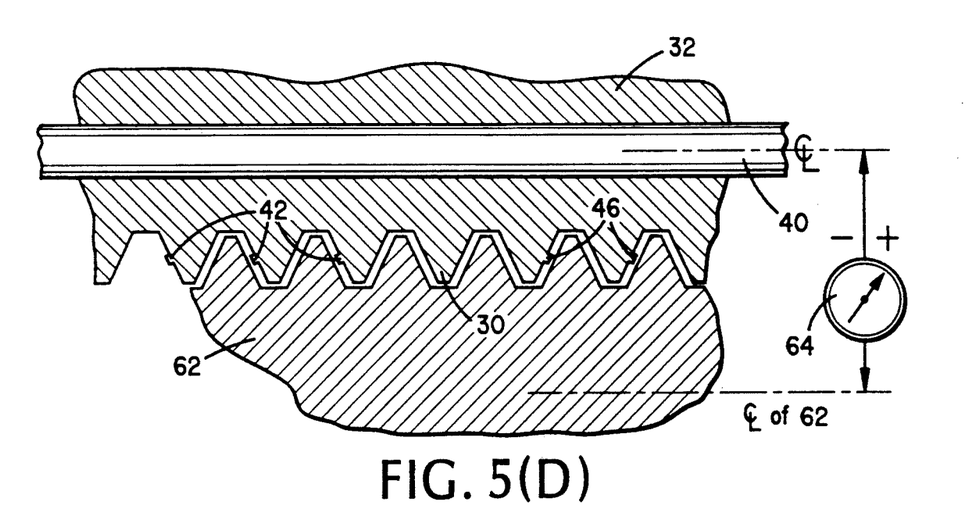

FIG. 5(D) shows a section of gage roll 32 with bosses 42 remaining on ridges to the left of center ridge 30 and bosses 46 remaining on ridges to the right of the center ridge. Again, the other "PD" bosses on ridge 30 are removed from this section of gage roll 32.

When measurement of the degree of insertion of the section of gage roll 32 on FIG. 5(C) is compared to the degree of insertion of the section of the gage roll on FIG. 5(D), the lead analysis is devoid of any influence of taper. Equal readings indicate perfect lead of the "PD".

Degree of stretch lead of screw thread 62 is measured when the reading of indicator 64 on FIG. 5(C) is greater than that on FIG. 5(D).

Degree of shrink lead of screw thread 62 is measured when the reading of indicator 64 on FIG. 5(D) is greater than that on FIG. 5(C).

Degree of taper of screw thread 62 is measured as onehalf the difference of the readings of gage 64 on FIGS. 5(C) and 5(D) subtracted for the reading of gage 64 on FIG. 5(B). Then, one must double this value for radius measurement or screw thread 62, or quadrupled for diameteral of two sides.

All the above measurements are radius measurements of screw thread 62 within the length of contact of roll 32 to the thread. Consideration must be given when using different gage frames, whether one is obtaining radius or diameter measurement with roll 32.

All the above comparisons are taken at one place at a time on screw thread 62. This is to eliminate oval and out-of-round influences if screw thread 62 were rotated while measuring. Lead error is usually a constant all around screw thread 62, while drunk usually found on one side only.

Figure 6A:
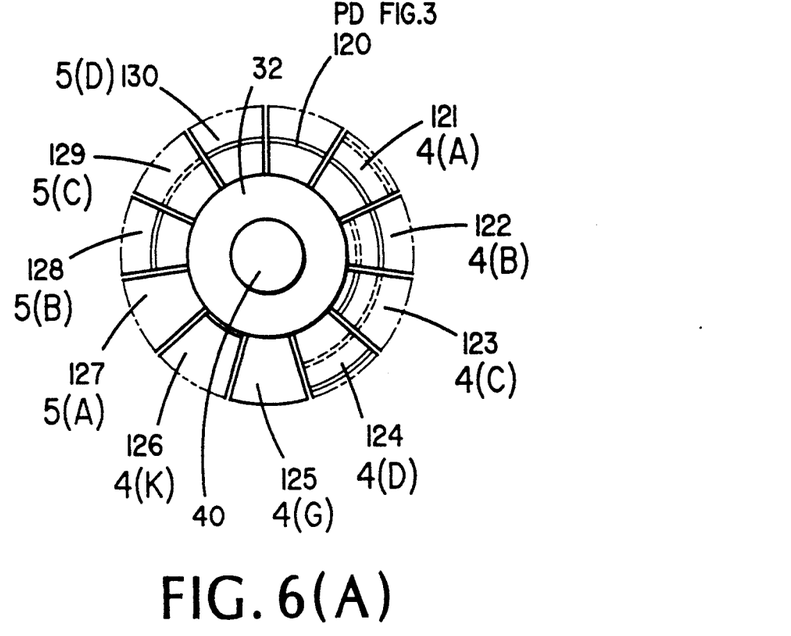
FIG. 6(A) is an end elevational view of a threaded gaging tool element including the embodiments of FIGS. 2-5.

FIG. 6(A) illustrates the end view of a gaging roll, generally indicated by the reference numeral 32, which includes a number of gaging segments. Gaging roll 32 is free to turn on central axial portion 40, thus presenting different segments to contact screw thread 62 (not shown on FIG. 6(A)).

The segments shown include segments 120-130. Segment 120 has the "PD" form of FIG. 3; segment 121 has the form of FIG. 4(A); segment 122 the form of FIG. 4(B); segment 123 the form of FIG. 4(C); segment 124 the form of FIG. 4(D). Segment 125 the form of FIG. 4(G) to measure root diameter as it relates to runout and size to the "PD" in segment 120. Segment 126 has the form of FIG. 4(J) to check diameter and runout of the tops of thread to the "PD". Segment 127 is full form for functional check of threads as in FIG. 5(A). Segment 128 has the form of FIG. 5(B) for checking lead. Segment 129 has the form of FIG. 5(C) for checking taper and lead. Segment 130 has the form of FIG. 5(D) for checking taper and lead in conjunction with segments 128 and 129.

It will be understood that additional or fewer segments can be provided on gaging roll 32 or ridge 30 to make a greater or fewer number of measurements. Comparison of the various measurements will provide a relatively complete profile of the shape of the groove of the thread being measured.

Figure 6B:
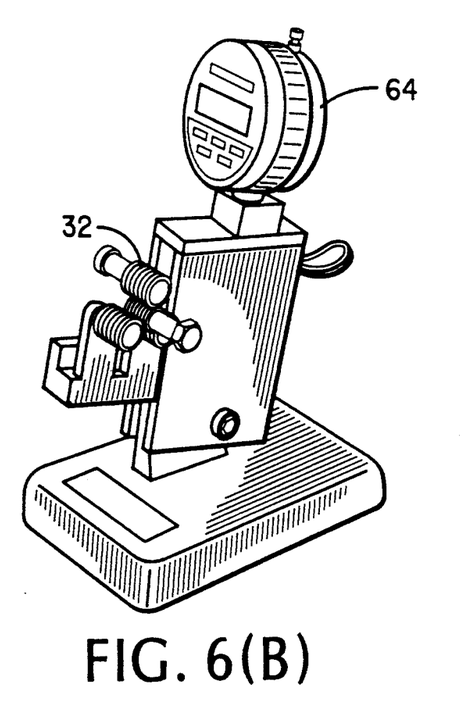
FIG. 6(B) is a perspective view of a conventional radial displacement gage with the gaging tool of FIG. 6(A) mounted therein.
Figure 6C:
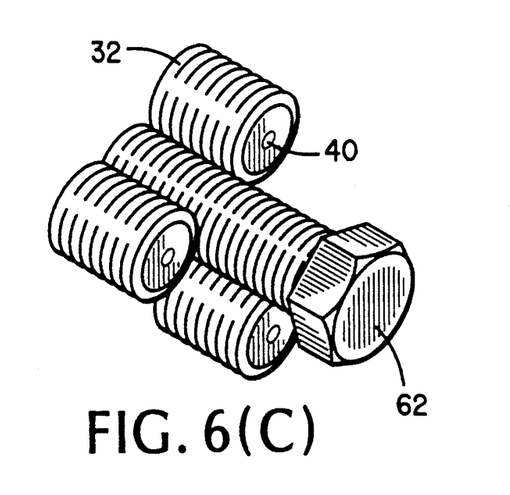
FIG. 6(C) is a perspective view of a three-roll gage including the gaging tool of FIG. 6(A).

As indicated above, gaging roll 32 (FIG. 6(A)) will be operatively connected in known manner to a conventional mechanical or electronic gage, as shown on FIG. 6(B), to indicate plus or minus radial displacement of the gaging roll with respect to the screw thread 62 being measured, in order to make the measurements indicated above. Gaging roll 32 may be employed in a three roll gage as shown on FIG. 6(C).

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method for determining whether the threads of an screw have shrink lead or stretch lead, said thread, having a given pitch in the absence of said shrink lead or stretch lead, each of the grooves of said thread having two flanks extending upwardly and outwardly from a relatively narrow root portion to a relatively wide addendum portion, comprising:

(a) attempting to insert in said thread at least first and second fixedly joined measuring teeth spaced apart along a portion of a length of said screw on either side of an axially central portion of said screw a distance which is a multiple of said pitch, portions of the flanks of said first and second measuring teeth facing said central portion to contact said grooves at predetermined points when inserted therein if said thread has said given pitch, and having the flanks of said teeth facing away from said central portion cut away a selected amount, such that, if said thread has shrink lead, said first and second measuring teeth can be inserted into said thread; and (b) attempting to insert in said thread at least third and fourth fixedly joined measuring teeth spaced apart along a portion of a length of said screw on either side of said central portion a multiple of said pitch, portions of the flanks of said third and fourth measuring teeth facing away from said central portion to contact said grooves at predetermined points when inserted therein if said thread has said given pitch, and having the flanks of said third and fourth teeth facing toward said central portion cut away a selected amount, such that, if said thread has stretch lead, said third and fourth measuring teeth can be inserted into said thread.

2. A method, as defined in claim 1, further comprising the step of measuring the radial distance said first and second or said third and fourth measuring teeth are inserted into said thread to determine the degree of shrink lead or stretch lead, respectively.

3. A method, as defined in claim 1, further comprising the step of attempting to insert in said thread at least fifth and sixth measuring teeth which can be inserted in said thread when said thread has neither shrink lead nor stretch lead.

4. A method, as defined in claim 1, further comprising providing as said at least first and second measuring teeth a portion of a multiple-rib, full-form gage roll in which, in cross-section, the flanks of the teeth thereof facing away from said central portion have been cut away said selected amount.

5. A method, as defined in claim 1, further comprising providing as said at least third and fourth measuring teeth a portion of a multiple-rib, full-form gage roll in which, in cross-section, the flanks of the teeth thereof facing toward said central portion have been cut away said selected amount.

6. A method as defined in claim 3, further comprising providing as said at least fifth and sixth measuring teeth a portion of a multiple-rib, full-form gage roll.

7. A method for measuring the shape of a groove of a thread having first and second flanks extending upwardly and outwardly from a relatively narrow root portion to a relatively wide top portion, said groove having opposing pitch diameter points on said flanks, said flanks each having addendum and dedendum portions, said thread having a major axis, said tool comprising:
- (a) a gage roll rib engagable with said groove, said gage roll rib having first and second flanks engagable, respectively, with said first and second flanks of said groove, and gage roll being radially and axially moveable with respect to said major axis of said thread;
- (b) means to measure radial position of said gage roll rib relative to said the major axis of said thread;
- (c) at a first position of rotation of said gage roll, first and second bosses defined, respectively, on said first and second flanks of said gage roll rib, said first boss being engagable with the pitch diameter point on said first flank of said groove and said second boss being engagable with the pitch diameter point on said second flank of said groove;
- (d) at a second position of rotation of said gage roll, third and fourth bosses defined, respectively, on said first and second flanks of said gage roll rib, said third boss being engagable with the pitch diameter point on said first flank of said groove and said fourth boss being engagable with said addendum of said second flank of said groove; and
- (e) at a third position of rotation of said gage roll, fifth and sixth bosses defined, respectively, on said first and second flanks of said gage roll rib, said fifth boss being engagable with the pitch diameter point on said first flank of said groove and said second boss being engagable with said dedendum on said second flank of said groove;

whereby, successive engagements of said groove with said gage roll at said first, second, and third positions of rotation of said gage roll, while measuring only said radial position of said gage roll relative to said groove, will generate a profile of the shape of said second flank.

8. A tool for determining if the threads of a screw have shrink lead, each of the grooves of said thread having two flanks extending upwardly and outwardly from a relatively narrow root portion to a relatively wide addendum portion, said screw having a major axis, said tool comprising:
- (a) a gage roll having at least first and second ribs engagable with at least first and second grooves, respectively, said first and second ribs being spaced apart on either side of an axially central portion of said gage roll, each of said ribs having first and second flanks, said first flank of said first rib facing away from said central portion, said second flank of said first rib facing toward said central portion, said first flank of said second rib facing said central portion, and said second flank of said second rib facing away from said central portion, and said gage roll being radially and axially moveable with respect to said major axis of said thread;
- (b) means to measure radial position of said gage roll rib relative to major axis of said screw;
- (c) said first flank of said first rib and said second flank of said second rib having outwardly facing bosses thereon, such that, if said thread has shrink lead, said first and second ribs can be inserted into said first and second grooves a lesser radial distance than if said thread does not have shrink lead.

9. A tool, as defined in claim 8, further comprising at least third and fourth ribs on said gage roll, said third and fourth ribs being inserted in at least third and fourth grooves on said thread when said thread has neither shrink or stretch lead.

10. A tool for determining if the threads of a screw have stretch lead, said thread without stretch lead having a given pitch, each of the grooves of said thread having two flanks extending upwardly and outwardly from a relatively narrow root portion to a relatively wide addendum portion, said screw having a major axis, said tool comprising:
- (a) a gage roll having at least first and second ribs engagable with at least first and second grooves, respectively, said first and second ribs being spaced apart on either side of an axially central portion of said gage roll, each of said ribs having first and second flanks, said first flank of said first rib facing away from said central portion, said second flank of said first rib facing toward said central portion, said first flank of said second rib facing said central portion, and said second flank of said second rib facing away from said central portion, and said gage roll being radially and axially moveable with respect to the major axis of said thread;
- (b) means to measure radial position of said gage roll rib relative to the major axis of said screw;
- (c) said second flank of said first rib and said first flank of said second rib having outwardly facing bosses thereon, such that, if said thread has stretch lead, said first and second ribs can be inserted into said first and second grooves a lesser radial distance than if said thread does not have stretch lead.

11. A tool, as defined in claim 10, further comprising at least third and fourth ribs on said gage roll, said third and fourth ribs being insertable in at least third and fourth grooves on said thread when said thread has neither shrink nor stretch lead.

* * * * *